(12) United States Patent
Yan (10) Patent No.: US 10,831,881 B2
(45) Date of Patent: Nov. 10, 2020

(54) METHOD AND TERMINAL FOR ENHANCING INFORMATION SECURITY

(71) Applicant: Huawei Technologies Co., Ltd., Shenzhen (CN)

(72) Inventor: Yongjie Yan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 16/213,148

(22) Filed: Dec. 7, 2018

(65) Prior Publication Data
US 2019/0108329 A1 Apr. 11, 2019

Related U.S. Application Data

(63) Continuation of application No. PCT/CN2016/085108, filed on Jun. 7, 2016.

(51) Int. Cl.
*G06F 21/00* (2013.01)
*G06F 21/45* (2013.01)
(Continued)

(52) U.S. Cl.
CPC .............. *G06F 21/45* (2013.01); *G06F 8/61* (2013.01); *G06F 21/31* (2013.01); *G06F 21/46* (2013.01);
(Continued)

(58) Field of Classification Search
CPC . G06F 21/45; G06F 8/61; G06F 21/31; G06F 21/46; G06F 2221/2131; H04L 63/083; H04W 88/02
See application file for complete search history.

(56) References Cited

U.S. PATENT DOCUMENTS

2010/0275032 A1 10/2010 Bhangi
2013/0174236 A1 7/2013 You
(Continued)

FOREIGN PATENT DOCUMENTS

CN 103034721 A 4/2013
CN 103593619 A 2/2014
(Continued)

OTHER PUBLICATIONS

Machine Translation and Abstract of Chinese Publication No. CN103593619, Feb. 19, 2014, 23 pages.
(Continued)

*Primary Examiner* — Yogesh Paliwal
(74) *Attorney, Agent, or Firm* — Conley Rose, P.C.

(57) ABSTRACT

A method and a terminal for enhancing information security, where the method includes receiving, by a terminal, an open instruction of a sensitive application, starting a security policy of the sensitive application, displaying prompt information that a notification message arrives when the notification message related to the sensitive application is received, and displaying a prompt for entering a password when an instruction for opening the notification message is received. Hence, a preset security policy is automatically started when the sensitive application is used. When the notification message related to the sensitive application is received, a corresponding password needs to be entered. This enhances information security, facilitates use by a user, and improves user experience.

20 Claims, 4 Drawing Sheets

(51) Int. Cl.
*G06F 21/46* (2013.01)
*H04L 29/06* (2006.01)
*G06F 8/61* (2018.01)
*G06F 21/31* (2013.01)
*H04W 88/02* (2009.01)

(52) U.S. Cl.
CPC .... *H04L 63/083* (2013.01); *G06F 2221/2131* (2013.01); *H04W 88/02* (2013.01)

(56) References Cited

U.S. PATENT DOCUMENTS

| | | | | |
|---|---|---|---|---|
| 2013/0311894 | A1* | 11/2013 | Rexer | G06F 21/604 715/741 |
| 2014/0256288 | A1* | 9/2014 | Allen | H04W 12/02 455/411 |
| 2014/0366158 | A1 | 12/2014 | Han et al. | |
| 2015/0121509 | A1 | 4/2015 | Nakazato et al. | |
| 2015/0249681 | A1* | 9/2015 | Zhang | G06F 40/205 726/1 |
| 2016/0055323 | A1* | 2/2016 | Stuntebeck | G06F 21/31 726/17 |
| 2017/0064549 | A1* | 3/2017 | Rykowski | H04L 67/34 |
| 2019/0258808 | A1 | 8/2019 | Han et al. | |

FOREIGN PATENT DOCUMENTS

| | | |
|---|---|---|
| CN | 103617382 A | 3/2014 |
| CN | 104601857 A | 5/2015 |
| CN | 104660814 A | 5/2015 |
| CN | 105378743 A | 3/2016 |
| CN | 105389518 A | 3/2016 |
| CN | 106446631 A | 2/2017 |
| JP | 2003223400 A | 8/2003 |
| JP | 2012160155 A | 8/2012 |
| JP | 2013114291 A | 6/2013 |
| WO | 2010050192 A1 | 5/2010 |
| WO | 2013000150 A1 | 1/2013 |

OTHER PUBLICATIONS

Machine Translation and Abstract of Chinese Publication No. CN103617382, Mar. 5, 2014, 16 pages.
Machine Translation and Abstract of Chinese Publication No. CN104660814, May 27, 2015, 20 pages.
Foreign Communication From a Counterpart Application, PCT Application No. PCT/CN2016/085108, English Translation of International Search Report dated Feb. 22, 2017, 2 pages.
Foreign Communication From a Counterpart Application, PCT Application No. PCT/CN2016/085108, English Translation of Written Opinion dated Feb. 22, 2017, 4 pages.
Machine Translation and Abstract of Japanese Publication No. JP2003223400, Aug. 8, 2003, 17 pages.
Machine Translation and Abstract of Japanese Publication No. JP2012160155, Aug. 23, 2012, 18 pages.
Machine Translation and Abstract of Japanese Publication No. JP2013114291, Jun. 10, 2013, 21 pages.
Machine Translation and Abstract of International Publication No. WO2010050192, May 6, 2010, 33 pages.
Foreign Communication From a Counterpart Application, Japanese Application No. 2018-563799, Japanese Office Action dated Dec. 3, 2019, 4 pages.
Foreign Communication From a Counterpart Application, Japanese Application No. 2018-563799, English Translation of Japanese Office Action dated Dec. 3, 2019, 5 pages.
Foreign Communication From a Counterpart Application, European Application No. 16904310.6, Extended European Search Report dated Apr. 10, 2019, 7 pages.
Machine Translation and Abstract of Chinese Publication No. CN106446631, Feb. 22, 2017, 26 pages.
Foreign Communication From a Counterpart Application, Chinese Application No. 201680023258.0, Chinese Office Action dated Jun. 3, 2019, 12 pages.

* cited by examiner

METHOD AND TERMINAL FOR ENHANCING INFORMATION SECURITY

CROSS-REFERENCE TO RELATED APPLICATIONS

This application is a continuation of International Patent Application No. PCT/CN2016/085108 filed on Jun. 7, 2016, which is hereby incorporated by reference in its entirety.

TECHNICAL FIELD

The present disclosure relates to the information security field, and in particular, to a method and a terminal for enhancing information security in a specific application scenario.

BACKGROUND

Development of the Internet brings a growing quantity of application scenarios of making payment using a mobile terminal. To facilitate use by a user, an application that payment is made using a mobile terminal usually provides a login password retrieval function. The login password retrieval function is usually provided in a specific retrieval way, for example, using a short message service (SMS) message and an electronic mail (e-mail) such that when the user forgets a password, the application may still be used using the password retrieval function. However, when a mobile terminal of a user is lost and is used by a malicious user, the malicious user may use a password retrieval function of a corresponding application, obtain a verification code using an SMS message, an e-mail, or another specific manner, and set a new password to perform a corresponding application operation, resulting in personal payment data and economic losses of the user.

In other approaches, a user may manually set a screen lock of a mobile terminal or an application lock of a related application to reduce security information disclosure problems.

SUMMARY

Embodiments of the present disclosure provide a method and a terminal for enhancing information security, to resolve a security information disclosure problem in a process of retrieving a password using a login password retrieval function provided by a mobile payment application.

According to a first aspect, the present disclosure provides a method for enhancing information security, where the method may include starting a security policy of a sensitive application when a terminal receives an open instruction of the sensitive application, displaying, by the terminal, prompt information that the notification message arrives when receiving the notification message related to the sensitive application, and displaying a prompt for entering a password when the terminal receives an instruction for opening the notification message.

Based on the provided method for enhancing information security, a preset security policy is automatically started when the sensitive application is used. When the notification message related to the sensitive application is received, a password for opening the notification message needs to be entered. This enhances information security, facilitates use by a user, and improves user experience.

In a design solution, before receiving the open instruction of the application, the method may further include receiving a password entered by a user, and determining whether the password entered by the user is correct, and obtaining, by the terminal, content of the notification message when the password entered by the user is correct, or displaying, by the terminal, a prompt for reentering a password or returning to a login screen of the sensitive application when the password entered by the user is incorrect.

In a design solution, when the password entered by the user is correct, the terminal displays a prompt for stopping the security policy of the sensitive application, for the user to select whether to start the security policy of the sensitive application when the sensitive application is used next time.

In another design solution, before the terminal receives the open instruction of the sensitive application, the method further includes installing, by the terminal, the sensitive application, and displaying, according to a sensitive application list, a prompt for setting the security policy for the installed sensitive application, or when the terminal is initialized or the terminal is delivered from a factory, obtaining, by the terminal, a sensitive application list, determining whether the terminal installs the sensitive application in the sensitive application list, and displaying a prompt for setting the security policy for the installed sensitive application.

In another design solution, obtaining, by the terminal, a sensitive application list further includes obtaining, by the terminal, the sensitive application list from a cloud, or obtaining a sensitive application list from a memory of the terminal, where the sensitive application list is a sensitive application list manually set by a user according to a personal need.

In still another design solution, displaying a prompt for setting the security policy for the sensitive application includes displaying a prompt for setting a password, where the password is used to open the notification message, to obtain content of the notification message.

According to a second aspect, the present disclosure provides a terminal for enhancing information security, and the terminal includes a receiving unit, a start unit, and a display unit, where the receiving unit is configured to receive an open instruction of a sensitive application, the start unit is configured to start a security policy of the sensitive application, and the display unit is configured to, when the receiving unit receives a notification message related to the sensitive application, display prompt information that the notification message arrives, and is further configured to, when an instruction for opening the notification message is received, display a prompt for entering a password.

According to the provided terminal for enhancing information security, a preset security policy is automatically started when the sensitive application is used. When the notification message related to the sensitive application is received, a password for opening the notification message needs to be entered. This enhances information security, facilitates use by a user, and improves user experience.

In a design solution, the terminal further includes a determining unit and an obtaining unit, where the receiving unit is further configured to receive a password entered by a user, the determining unit is configured to determine whether the password entered by the user is correct, and when the determining unit determines that the password entered by the user is correct, the obtaining unit obtains content of the notification message, or when the determining unit determines that the password entered by the user is incorrect, the display unit displays a prompt for reentering a password, improving user experience.

In a design solution, the display unit is further configured to display a prompt for stopping the security policy of the sensitive application to prompt the user whether to start the security policy of the sensitive application when the sensitive application is used next time. This improves user experience.

In another design solution, the terminal may further include an installation unit configured to install the sensitive application, and the display unit is further configured to display, according to a sensitive application list, a prompt for setting the security policy for the sensitive application, or when the terminal is initialized and is in an initialized state or the terminal is delivered from a factory, the obtaining unit obtains a sensitive application list, the determining unit determines whether the sensitive application in the sensitive application list is installed, and the display unit display a prompt for setting the security policy for the installed sensitive application.

In another design solution, that the obtaining unit obtains a sensitive application list further includes obtaining a sensitive application list from a cloud, or obtaining a sensitive application list obtained from a memory of the terminal, where the sensitive application list obtained from the memory of the terminal is a sensitive application list set by a user according to a personal need.

In still another design solution, that the display unit displays a prompt for setting the security policy for the sensitive application includes displaying a prompt for setting a password, where the password is used to open the notification message to obtain content of the notification message.

In the first aspect and the second aspect, the security policy includes that when the terminal (or the receiving unit of the terminal) receives the notification message related to the sensitive application, displaying only the prompt information that the notification message arrives, without displaying the content of the notification message.

In the first aspect and the second aspect, the notification message is a system notification, an SMS message, or an e-mail.

According to a third aspect, the present disclosure further provides a terminal, and the terminal includes a display configured to display prompt information of received notification message, the notification message, and information for prompting a user to perform settings, a memory configured to store an instruction, and a processor configured to call the instruction stored in the memory to implement the following operations of receiving an open instruction of a sensitive application, starting a security policy of the sensitive application, displaying prompt information that the notification message arrives when the notification message related to the sensitive application is received, and displaying a prompt for entering a password when an instruction for opening a notification message is received.

Based on the method and the terminal for enhancing information security provided in the present disclosure, when the sensitive application is used, the security policy related to the sensitive application is automatically started. When the notification message related to the sensitive application is received, only the prompt information that the notification message is received is displayed, and the specific content of the notification message is not displayed. When the instruction for opening the notification message is received, the password needs to be entered. This avoids that security information is obtained directly from a system function or the application using the password retrieval function in the password retrieval process, resolving the user security information disclosure problem, and enhancing user information security. In addition, this facilitates use by a user and improves user experience.

BRIEF DESCRIPTION OF DRAWINGS

To describe the technical solutions in some of the embodiments of the present disclosure more clearly, the following briefly describes the accompanying drawings describing some of the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

A method and a terminal for enhancing information security provided in the present disclosure may be applied to login password retrieval functions of various applications, for example, may be applied to login password retrieval functions of various third-party applications in a terminal. In embodiments of the present disclosure, a terminal may be a mobile device, such as a mobile phone and a tablet, that has the same function as a mobile phone.

In the embodiments of the present disclosure, a sensitive application may be a payment type application or another type of application that relates to economic information of a user or personal security information of a user, such as WECHAT and ALIPAY. When an application is being installed, the terminal determines whether the application is a sensitive application. When determining that the application is a sensitive application, the terminal prompts a user to start a security policy of the sensitive application. If the user agrees to start the security policy, the terminal further prompts the user to set a password for unlocking the security policy. The password may be a number, a fingerprint, a pattern, or another password.

In the embodiments of the present disclosure, the security policy includes that, when a notification message related to the sensitive application is received, only prompt information of the received notification message is displayed, and content of the notification message is not displayed.

When the user opens the installed sensitive application, the security policy of the installed sensitive application is started. When a notification message arrives, only a notification that the notification message arrives is displayed, and the content of the notification message is not displayed. If needing to open the notification message, the user is prompted to enter a password. When the entered password is correct, the content of the corresponding notification message may be viewed. This avoids a security information disclosure problem caused by a corresponding operation performed using a login password retrieval function by the user. In this way, information security is enhanced, and ease of use of the terminal is improved.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
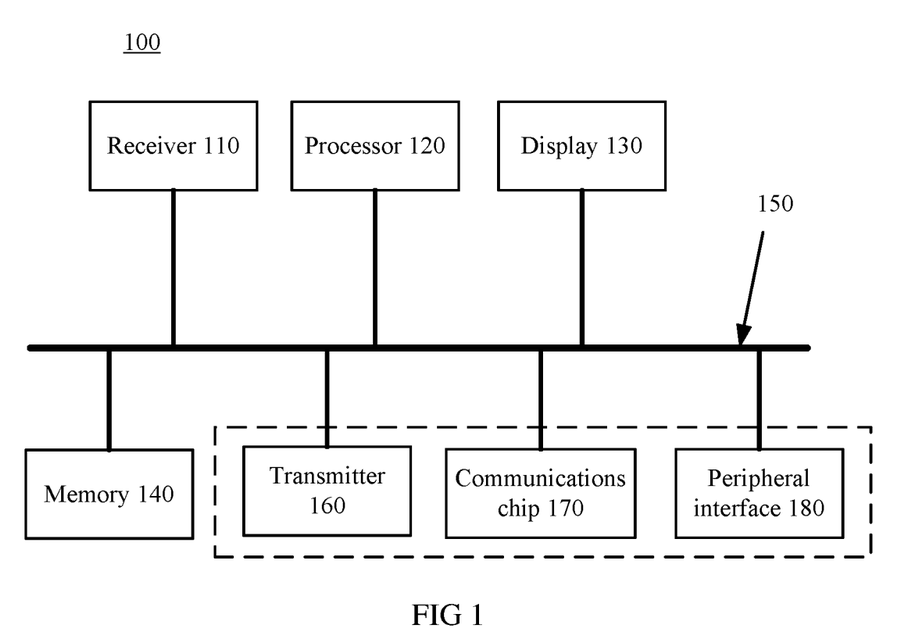
FIG. 1 is a schematic structural diagram of a terminal according to an embodiment of the present disclosure.

FIG. 1 is a schematic structural diagram of a terminal 100 according to an embodiment of the present disclosure.

As shown in FIG. 1, the terminal 100 includes a receiver 110, a processor 120, a display 130, a memory 140, and a communications bus 150. The receiver 110, the processor 120, the display 130, and the memory 140 are connected and communicate with each other using the communications bus 150.

The receiver 110 is configured to receive an instruction entered by a user. The memory 140 is configured to store an instruction and data. The processor 120 is configured to call the instruction in the memory 140 and execute a corresponding operation. The display 130 is configured to display output information.

In this embodiment of the present disclosure, the processor 120 may be a central processing unit (CPU). The processor 120 may alternatively be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor 120 may alternatively be any conventional processor or the like.

The memory 140 may include a read-only memory (ROM) and a random access memory (RAM), and provides an instruction and data to the processor 120. A part of the memory 140 may further include a non-volatile RAM (NVRAM). For example, the memory 140 may further store device type information.

The communications bus 150 may further include a power bus, a control bus, a status signal bus, and the like, in addition to a data bus. However, for clear description, various types of buses in the figure are marked as the communications bus 150.

In this embodiment of the present disclosure, the terminal 100 may further include a device such as a transmitter 160, a communications chip 170, and/or a peripheral interface 180.

Figure 2:
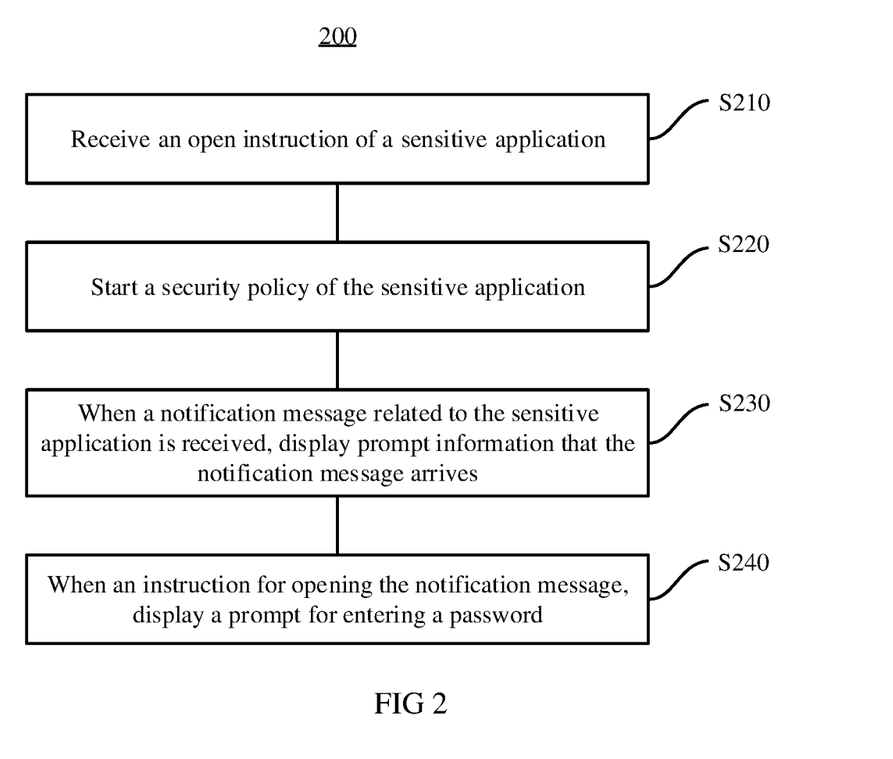
FIG. 2 is a flowchart of a method for enhancing information security according to an embodiment of the present disclosure.

FIG. 2 is a flowchart of a method 200 for enhancing information security according to an embodiment of the present disclosure. The method 200 is performed by a terminal that may enhance information security, and the terminal may be a terminal shown in FIG. 1. As shown in FIG. 2, the method 200 may include the following steps.

Step S210. Receive an open instruction of a sensitive application.

Further, in this embodiment of the present disclosure, the sensitive application is an application that relates to economic data of a user or personal information of a user, for example, a payment type application for payment by a terminal.

When the user needs to use the sensitive application that has been installed on the terminal, the user enters, using the terminal, the open instruction that is used to open the desired sensitive application, that is, runs the desired sensitive application.

Step S220. Start a security policy of the sensitive application.

When the terminal receives the open instruction entered by the user for opening the sensitive application, the terminal automatically starts a preset security policy.

Step S230. When a notification message related to the sensitive application is received, display prompt information that the notification message arrives.

After the security policy of the sensitive application is started, when the terminal receives the notification message, such as an e-mail or an SMS message related to the sensitive application, that includes a verification code or a password, only the prompt information of the received notification message is displayed, but content of the notification message is not displayed.

The notification message may be a system notification, an SMS message, or an e-mail.

For example, the terminal starts the security policy of the sensitive application, and the user uses the login password retrieval function of the sensitive application. In this case, a server returns the related notification message, for example, the notification message that arrives at the terminal in a form of an SMS message or an e-mail. It is assumed that when a user performs a password retrieval function, the user selects a manner of sending an SMS verification code to retrieve a password. In this case, a server of the sensitive application sends an SMS message including a verification code. When the terminal receives the SMS message including the verification code, only prompt information that an SMS message is received is displayed. For example, an SMS message icon is displayed, or a prompt field, such as you have a new SMS message, is displayed, or a voice prompt, such as you have a new SMS message, is played. However, content of the received SMS message is not displayed. Similarly, it is assumed that the user selects a manner of sending an e-mail to retrieve a password. When the e-mail arrives, a notification that the e-mail arrives is displayed, but content of the e-mail is not displayed.

Further, when receiving the notification message after the security policy of the sensitive application is started, the terminal determines whether the notification message is related to the sensitive application, for example, determines whether the notification message contains information such as a name or a name keyword of the sensitive application. If the notification message contains the information such as the name or the name keyword of the sensitive application, the notification message is considered to be related to the sensitive application.

Step S240. When the terminal receives an instruction for opening the notification message, display a prompt for entering a password.

When the user needs to read the content of the received notification message, the user needs to enter the instruction for opening the notification message. For example, if the terminal is a smart touchscreen terminal, the user may "tap" the notification message to read the content of the notification message. When receiving the open instruction, the terminal prompts the user to enter the password to open the notification message. When the user enters the correct password, the user can open the notification message and read the content of the notification message.

Further, when the user enters the correct password, the terminal can prompt the user to select whether to stop the security policy. After the security policy is stopped, when the password retrieval function is used again, content of an arrival notification message can be directly displayed, together with an arrival notification. If the user does not stop the security policy, an arrival notification is displayed to the user for the notification message related to the sensitive application, provided that the sensitive application is not closed.

It should be noted that, in this embodiment of the present disclosure, the password used by the user may be a preset password such as a combination of a number and a letter, a fingerprint, or a pattern.

According to the method for enhancing information security provided in this embodiment of the present disclosure, the preset security policy of the sensitive application is automatically started when the sensitive application is used, when the notification message related to the sensitive application is received, the corresponding password needs to be entered to open the notification message, display the content of the notification message, and the notification message is read in order to further perform a next step.

Compared with the other approaches that a screen lock or an application lock of a related application is used to reduce security information disclosure problems, this embodiment enhances information security. Not all users set a screen lock for a mobile terminal, or even if a user has set a screen lock, the password for unlocking a screen lock may be peeped because the password for unlocking the screen lock is frequently entered in some public places, and may be used by a malicious user, resulting in security information disclosure. For the application lock, application locks of applications that need to be locked are proactively set by the user, but most users are not able to determine the related applications that need to be locked to avoid the security information disclosure problem. Moreover, even if the user sets an application lock for a related application, the application lock cannot ensure that the security information is not disclosed by means of a system notification.

In this application, the policy is set for the sensitive application. When the notification message of the sensitive application is received, only the notification that the notification message arrives is displayed without displaying the content, and the content of the notification message can be read only when the password for opening the notification message is correct. This enhances information security, and also facilitates the use of the user, improving user experience.

Figure 3:
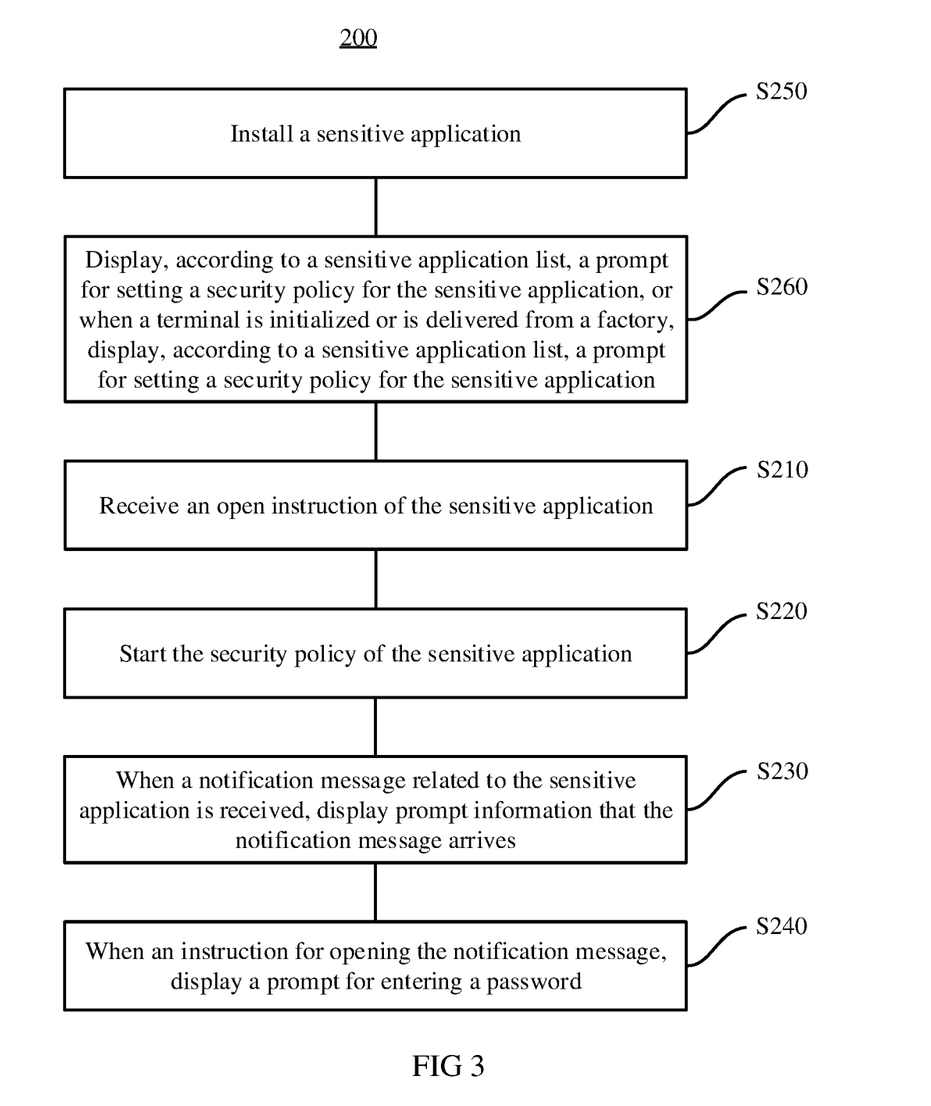
FIG. 3 is a flowchart of a method for enhancing information security according to another embodiment of the present disclosure.

Optionally, in another embodiment of the present disclosure, as shown in FIG. 3, before the terminal receives the opening instruction of the sensitive application, the method 200 further includes the following steps.

Step S250. Install the sensitive application.

The user installs, according to a personal need, the desired sensitive application, that is, an application related to economic data or personal security information of the user.

Step S260. Display, according to a sensitive application list, a prompt for setting a security policy for the sensitive application, or when the terminal is initialized or is delivered from a factory, display, according to a sensitive application list, a prompt for setting a security policy for the sensitive application.

Further, in this embodiment of the present disclosure, when the terminal installs a new application, the terminal determines, according to the sensitive application list, whether the newly installed application is a sensitive application related to economic data or personal security information of a user. If the new installed application is a sensitive application, the terminal displays a prompt for setting a security policy for the sensitive application, or when the terminal is started for the first time, that is, initialized to a factory setting state or delivered from a factory, the terminal automatically detects, according to the sensitive application list, whether applications in a system include the sensitive application related to economic data or personal security information of the user, and if the applications in a system include the sensitive application, the terminal displays a prompt for setting a security policy for each sensitive application.

It should be noted that, in this embodiment of the present disclosure, the terminal may further automatically detect at regular intervals whether a sensitive application is installed in the system.

In step S260, before the terminal automatically detects whether a sensitive application is installed, the terminal needs to obtain an application list.

In this embodiment of the present disclosure, the following two manners may be used to obtain the preset application list.

Manner 1: Obtain the sensitive application list from a cloud. A specific process may be sending to a cloud server a request for obtaining an application list such that the cloud server sends the application list to the terminal. The application list on the cloud may include an application that is commonly used and is well known by a user, and may also include an application that a user is not familiar with.

Manner 2: Obtain the sensitive application list that is stored in the terminal and that is set by the user. The sensitive application list may be stored directly in a storing system of the terminal, and is read and used directly when the sensitive application list needs to be used. When the user sets the sensitive application list, the user may add, to the sensitive application list, an application that is considered to be a sensitive application by the user, to implement setting the application list by a user. In this process, an interface for configuring the sensitive application list by a user may be developed for the terminal, to help the user to configure the sensitive application list. This improves user experience.

In this embodiment of the present disclosure, whether the sensitive application is installed in the terminal is determined by comparing an application identifier of each application in the sensitive application list with an identifier of an application installed in the terminal. When the identifier of the application installed in the terminal is the same as one or more application identifiers in the sensitive application list, it indicates that a corresponding application in the sensitive application list is installed in the terminal, otherwise, a corresponding application in the application list is not installed in the terminal. In this embodiment of the present disclosure, the application identifier is a unique identifier for identifying an application, and may be an application name, an application signature (an ANDROID package (APK) file), or an application package name (Package Name).

Further, the terminal prompts the user to set the security policy for the sensitive application such that the user of the terminal performs an operation of setting the security policy according to a personnel requirement. This improves user experience.

In this embodiment of the present disclosure, displaying a prompt for setting the security policy for the sensitive application includes displaying a prompt for setting a password, where the password is used to open the notification message to read content of the notification message.

The set password may be numbers, letters, a combination of symbols such as a number and a letter, a fingerprint, a pattern, or a password in another form.

In the method for enhancing information security provided in this embodiment of the present disclosure, when the sensitive application is used, the preset security policy related to the sensitive application is automatically started. When the notification message related to the sensitive application is received, a related system function and application corresponding to the notification message needs to be started, and the corresponding password needs to be entered. This improves user experience.

Optionally, in another embodiment of the present disclosure, after the terminal displays a prompt for entering a password, the method further includes receiving, by the terminal, a password entered by a user, and determining whether the password entered by the user is correct.

When the password entered by the user is correct, the terminal reads the content of the notification message. That is, when the password entered by the user is correct, the terminal opens the received notification message, to obtain the specific content of the notification message.

When the password entered by the user is wrong, the terminal displays a prompt for reentering the password. In this embodiment of the present disclosure, another implementation may alternatively be used, for example, a number of times for reentering the password is limited, or a user login interface of the sensitive application is directly returned to when the password entered by the user is wrong. This is not limited in this embodiment of the present disclosure.

Optionally, in another embodiment of the present disclosure, after the terminal reads the content of the notification message, the method further includes displaying, by the terminal, a prompt for stopping the security policy of the sensitive application. The user may select whether a password needs to be entered to display content of a notification message when the notification message related to the sensitive application is received next time, that is, select whether to continue to start the security policy for the sensitive application. This improves user experience.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The method for enhancing information security according to the embodiments of the present disclosure is described in detail with reference to FIG. 2 and FIG. 3, and a terminal that can enhance information security is described in detail below with reference to FIG. 4.

Figure 4:
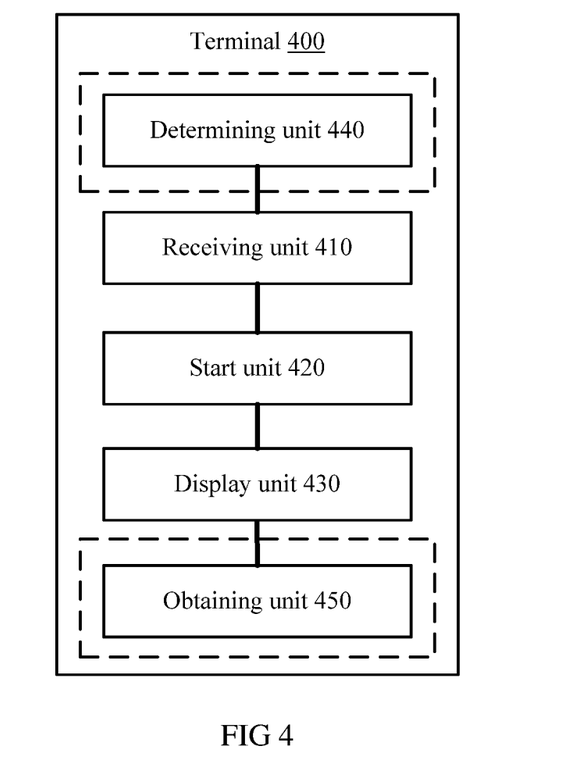
FIG. 4 is a schematic structural diagram of a terminal according to an embodiment of the present disclosure.

FIG. 4 is a schematic structural diagram of a terminal 400 according to an embodiment of the present disclosure. As shown in FIG. 4, the terminal 400 may include a receiving unit 410, a start unit 420, and a display unit 430, where the receiving unit 410 is configured to receive an open instruction of a sensitive application, the start unit 420 is configured to start a security policy of the sensitive application, and the display unit 430 is configured to, when the receiving unit 410 receives a notification message related to the sensitive application, display prompt information that the notification message arrives, where the display unit 430 is further configured to, when an instruction for opening the notification message is received, display a prompt for entering a password.

According to the terminal 400 for enhancing information security provided in this embodiment of the present disclosure, a preset security policy is automatically started when the sensitive application is used. When the notification message related to the sensitive application is received, a password for opening the notification message is entered to obtain specific content of the notification message. This enhances information security, facilitates use by a user, and improves user experience.

Optionally, in another embodiment of the present disclosure, the notification message may be a system notification, an SMS message, or an e-mail.

Optionally, in another embodiment of the present disclosure, the terminal 400 further includes a determining unit 440 and an obtaining unit 450, where the receiving unit 410 is further configured to receive a password entered by a user, the determining unit 440 is configured to determine whether the password entered by the user is correct, and if the password is correct, the obtaining unit 450 obtains the content of the notification message, or if the password is wrong, the display unit 430 displays a prompt for reentering the password.

Optionally, in another embodiment of the present disclosure, the terminal 400 further includes an installation unit (not shown) configured to install the sensitive application, and the display unit 430 is further configured to display, according to a sensitive application list, a prompt for setting the security policy for the sensitive application, or when the terminal 400 is initialized or is delivered from a factory, display, according to a sensitive application list, a prompt for setting the security policy for the sensitive application.

Optionally, in another embodiment of the present disclosure, the sensitive application list further includes a sensitive application list obtained from a cloud by the obtaining unit 450, or a sensitive application list that is stored in the terminal 400 and that is obtained by the obtaining unit 450.

Optionally, in another embodiment of the present disclosure, that the display unit 430 is further configured to display a prompt for setting a security policy for the sensitive application includes that the display unit 430 displays a prompt for setting the password, where the password is used to open the notification message to obtain content of the notification message.

Optionally, in another embodiment of the present disclosure, the display unit 430 is further configured to display a prompt for stopping the security policy of the sensitive application.

Further, when needing to obtain the specific content of the notification message, the user needs to enter the password to open the notification message. When the password entered is correct, the notification message is opened and the display unit 430 prompts the user whether to stop the security policy of the sensitive application. The user may select whether the password needs to be entered to display the content of the notification message when a notification message related to the sensitive application is received next time, that is, select whether the security policy needs to continue to be started for the sensitive application.

In this embodiment of the present disclosure, the notification message may be a system notification, an SMS message, or an e-mail.

According to the method for enhancing the security of information provided in the embodiments of the present disclosure, the preset security policy is automatically started when the sensitive application is used. When the notification message related to the sensitive application is received, only the prompt information that the notification message arrives is displayed, and the content of the notification message is not displayed, when an open instruction for opening the notification message is received, a password is prompted to be entered. This enhances information security, facilitates use by a user, and improves user experience.

It should be noted that, in the embodiments of the present disclosure, the units of the terminal 400 shown in FIG. 4 can implement the method steps shown in FIG. 2 and FIG. 3. For brevity of description, details are not further described herein.

In the several embodiments provided in the present disclosure, it should be understood that the disclosed method and terminal may be implemented in other manners. For example, the described terminal embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms. The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure. In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific implementations of the present disclosure, but are not intended to limit the protection scope of the present disclosure. Any modification or replacement figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for enhancing information security, the method being applied to a terminal, and the method comprising:
   installing, by the terminal, a sensitive application;
   displaying, by the terminal, a first prompt for setting a security policy for the sensitive application according to a sensitive application list when the terminal is initialized;
   receiving, by the terminal, an open instruction of the sensitive application;
   starting, by the terminal, the security policy of the sensitive application;
   displaying, by the terminal, prompt information indicating that a notification message arrives when the terminal receives the notification message related to the sensitive application; and
   displaying, by the terminal, a second prompt for entering a password when the terminal receives an instruction for opening the notification message.

2. The method of claim 1, wherein after displaying the second prompt for entering the password, the method further comprises:
   receiving, by the terminal, the password from a user;
   determining, by the terminal, whether the password from the user is correct;
   obtaining, by the terminal, content of the notification message when the password is correct; and
   displaying, by the terminal, a third prompt for reentering the password when the password is incorrect.

3. The method of claim 2, wherein after obtaining the content of the notification message, the method further comprises displaying, by the terminal, a fourth prompt for stopping the security policy of the sensitive application.

4. The method of claim 1, wherein the notification message is at least one of a system notification, a short message service (SMS) message, or an electronic mail (e-mail).

5. The method of claim 1, wherein the sensitive application list comprises at least one of:
   the sensitive application list obtained from a cloud; or
   the sensitive application list obtained from a memory of the terminal.

6. The method of claim 1, wherein displaying the first prompt for setting the security policy for the sensitive application comprises displaying, by the terminal, a third prompt for setting the password, and wherein the password opens the notification message to obtain content of the notification message.

7. The method of claim 1, wherein the security policy comprises displaying the prompt information indicating that the notification message arrives without displaying content of the notification message when the terminal receives the notification message related to the sensitive application.

8. The method of claim 1, further comprising, receiving, by the terminal, the password.

9. The method of claim 8, wherein the password comprises biometric information.

10. The method of claim 9, wherein the biometric information comprises a fingerprint.

11. The method of claim 8, wherein the password comprises a number.

12. A terminal for enhancing information security, comprising:
   a receiver configured to receive an open instruction of a sensitive application;
   a processor coupled to the receiver and configured to:
      install the sensitive application; and
      start a security policy of the sensitive application; and
   a display coupled to the processor and configured to:
      display a first prompt for setting the security policy for the sensitive application according to a sensitive application list when the terminal is initialized;
      display prompt information indicating that a notification message arrives when the receiver receives the notification message related to the sensitive application; and
      display a second prompt for entering a password when an instruction for opening the notification message is received.

13. The terminal of claim 12, wherein the receiver is further configured to receive the password from a user, and wherein the processor is further configured to:
   determine whether the password from the user is correct;
   obtain content of the notification message when the password is correct; and
   display a third prompt for reentering the password when the password is incorrect.

14. The terminal of claim 13, wherein the display is further configured to display a fourth prompt for stopping the security policy of the sensitive application.

15. The terminal of claim 12, wherein the notification message is at least one of a system notification, a short message service (SMS) message, or an electronic mail (e-mail).

16. The terminal of claim 12, wherein the sensitive application list comprises at least one of:
the sensitive application list obtained from a cloud; or
the sensitive application list obtained from a memory of the terminal.

17. The terminal of claim 12, wherein the display is further configured to display a third prompt for setting the password, and wherein the password opens the notification message to obtain content of the notification message.

18. The terminal of claim 12, wherein the security policy comprises displaying only the prompt information indicating that the notification message arrives without displaying content of the notification message when the terminal receives the notification message related to the sensitive application.

19. A terminal, comprising:
a display configured to:
display a first prompt for setting a security policy for a sensitive application according to a sensitive application list when the terminal is initialized; and
display prompt information of a notification message, the notification message, and information for prompting a user to perform settings;
a memory coupled to the display and configured to store an instruction; and
a processor coupled to the display and the memory, wherein the instruction is stored in the memory and causes the processor to be configured to:
install the sensitive application;
receive an open instruction of the sensitive application;
start the security policy of the sensitive application;
display prompt information indicating that a notification message related to the sensitive application arrives when the notification message related to the sensitive application is received; and
display a second prompt for entering a password when the terminal receives an instruction for opening the notification message.

20. A non-transitory computer readable storage medium having a computer usable program code, a computer device executing the computer usable program code to:
install a sensitive application;
display a first prompt for setting a security policy for the sensitive application according to a sensitive application list when the computer device is initialized;
receive an open instruction of the sensitive application;
start the security policy of the sensitive application;
display prompt information indicating that a notification message arrives when the computer device receives the notification message related to the sensitive application; and
display a second prompt for entering a password when the computer device receives an instruction for opening the notification message.

* * * * *